Nov. 25, 1969   J. W. BARNES ET AL   3,480,902
INTEGRATED CIRCUIT CARRIER
Filed May 11, 1967

INVENTORS.
JAMES W. BARNES
KENNETH R. HOOK
BY
ATTORNEYS.

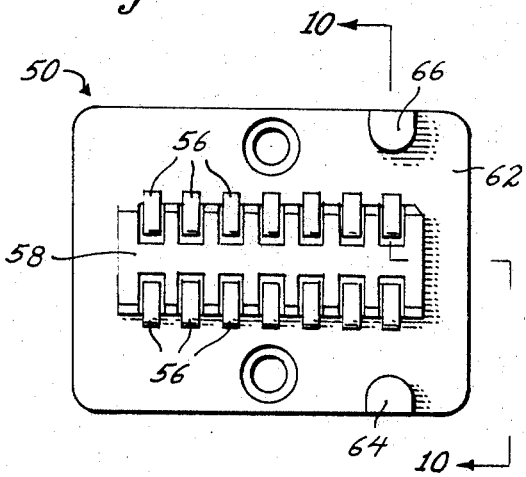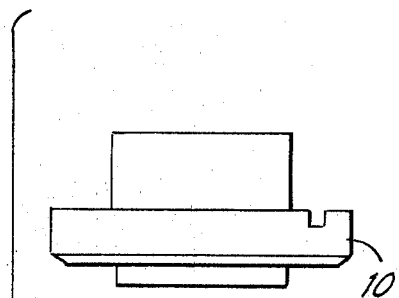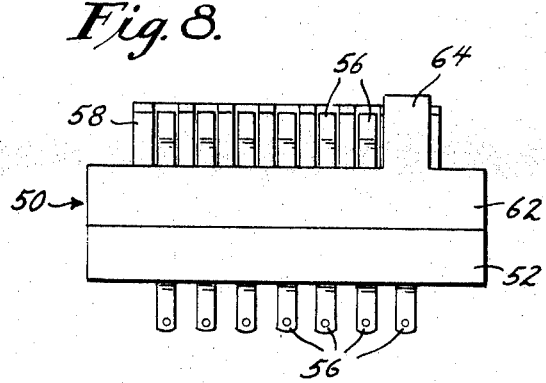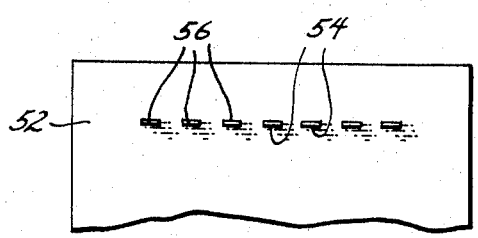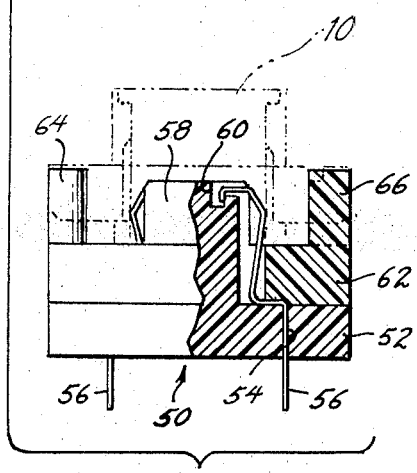

INVENTORS,
JAMES W. BARNES
KENNETH R. HOOK
BY
*Seidel & Gonda*
ATTORNEYS.

United States Patent Office

3,480,902
Patented Nov. 25, 1969

3,480,902
INTEGRATED CIRCUIT CARRIER
James W. Barnes, Drexel Hill, and Kenneth R. Hook, Devon, Pa., assignors to Barnes Development Company, Lansdowne, Pa., a corporation of Pennsylvania
Filed May 11, 1967, Ser. No. 637,834
Int. Cl. H05k 1/00
U.S. Cl. 339—17                              5 Claims

ABSTRACT OF THE DISCLOSURE

A carrier for a dual in-line package integrated circuit having central box open at either end with guide grooves formed in the sides to receive package leads. The carrier is provided with a flange having polarization notches and slots for fully mechanized handling. A cooperating contactor for the carrier to connect to test stand is provided. Contactor can be modified for loose dual in-line packages.

---

Figure 1:
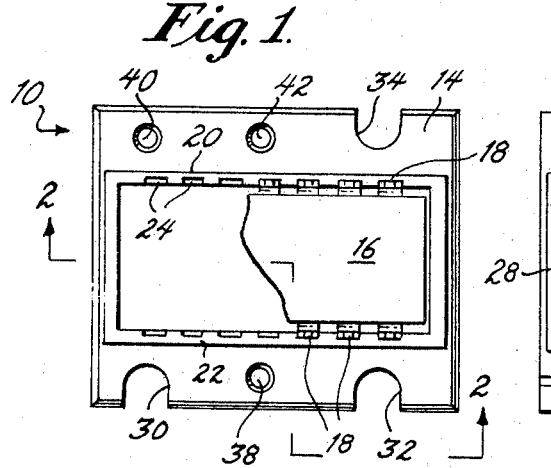

This invention relates to an integrated circuit carrier and socket contactor. More particularly, this invention relates to an integrated circuit package of the type having dual in-line leads.

Mainly because of their size, integrated circuits require special handling techniques. Directly related to the handling techniques is the necessity for providing carriers for the integrated circuit packages. These carriers provide means by which the integrated circuit packages can be handled and manipulated for marking, testing, including environmental testing, final packaging, user testing, and application of the package to circuit boards or the like. Thus, the carriers have a dual function. Their first function is to retain the integrated circuit. Their second function, which is related to the first function, is to retain the integrated circuit in a manner that permits them to be operated on by testing apparatus or the like as well as to provide means for manipulating them during the handling steps.

In particular, the present invention is a carrier which provides a high degree of convenience, speed and protection for handling and testing of 14 and 16 lead dual in-line integrated circuit packages. The present invention provides a box-like structure having grooves in the sides therein within which the integrated circuit package is positioned for retention. The leads are aligned and positioned in grooves formed in the interior sides of the box structure. In this manner, the integrated circuit is completely surrounded and its leads are protected. The sides act as reinforcement against which the leads can be pushed during contacting operations through a contactor. The box is open at either end so that the integrated circuit can be removed by pushing from the opposite end. Finally, a flange surrounds the box to provide manipulating structure for the entire carrier.

The invention also includes a contactor that cooperates with the carrier. The contactor can be modified to accept loose dual in-line packages and retain the correct lead angulation.

It therefore is a general object of the present invention to provide a new and unobvious carrier for integrated circuits of the dual in-line type.

It is another object of the present invention to provide a carrier for dual in-line integrated circuits which can be manipulated by automatic handling equipment and which cooperates with a contactor for testing.

Other objects will appear hereinafter.

For the purpose of illustrating the invention, there is shown in the drawings a form which is presently preferred; it being understood, however, that this invention is not limited to the precise arrangements and instrumentalities shown.

Figure 4:
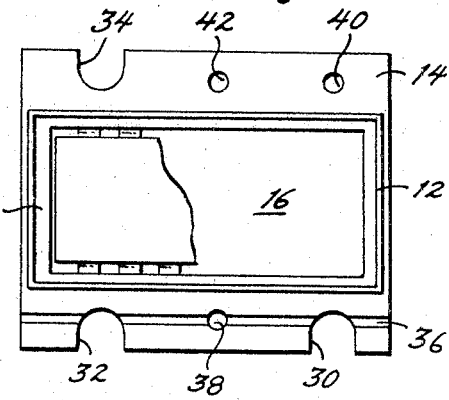
Figure 2:
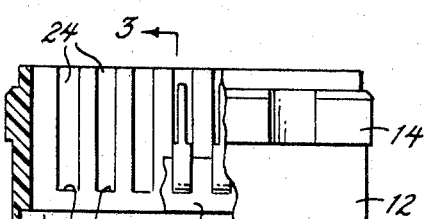
Figure 3:
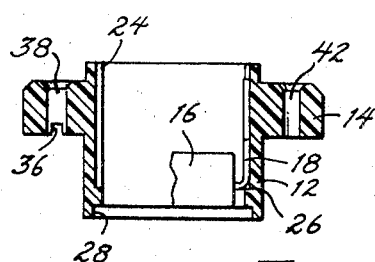
Figure 5:
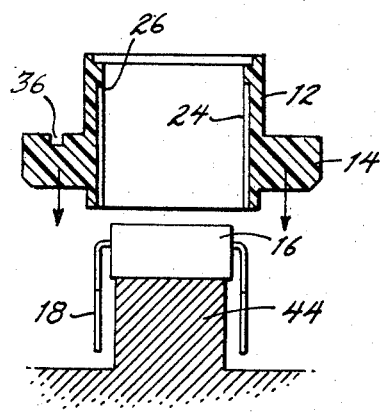
Figure 6:
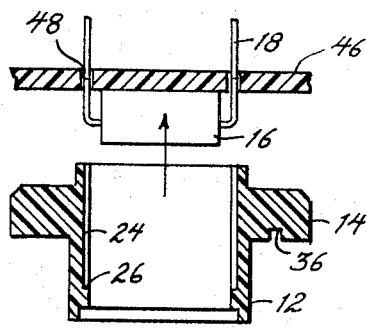
Figure 11:
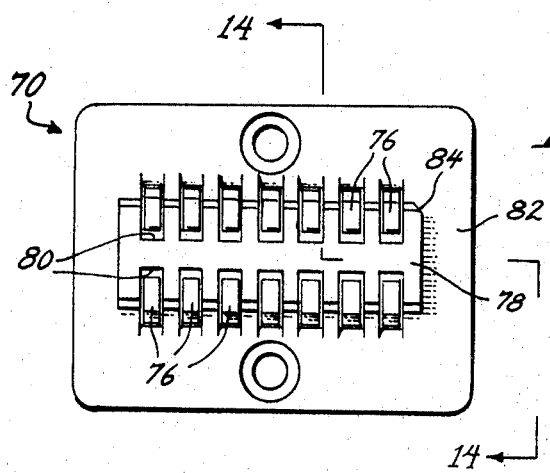
Figure 14:
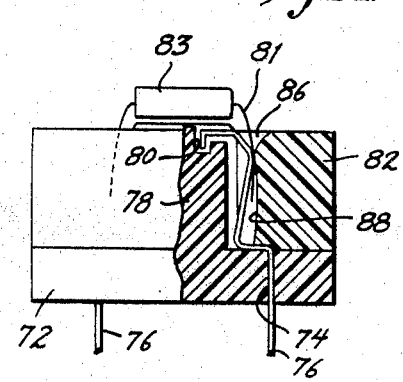
Figure 12:
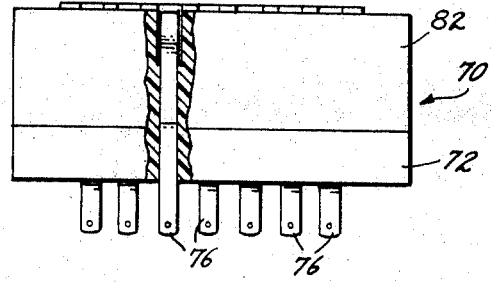
Figure 13:
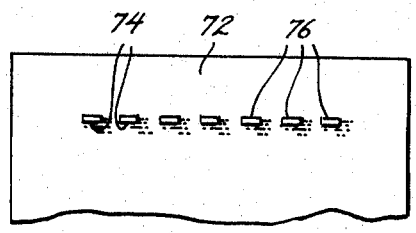

FIGURE 1 is a top view of the carrier.
FIGURE 2 is a partial sectional view of the carrier taken along the line 2—2 in FIGURE 1.
FIGURE 3 is a transverse sectional view of the carrier taken along the line 3—3 in FIGURE 2.
FIGURE 4 is a bottom view of the carrier.
FIGURE 5 is a transverse sectional view of the carrier illustrating a method of inserting an integrated circuit into the carrier.
FIGURE 6 is a transverse sectional view of the carrier illustrating a method of inserting the carrier into a printed circuit board.
FIGURE 7 is a top view of the contactor for use with the carrier.
FIGURE 8 is a side view of the contactor.
FIGURE 9 is a partial bottom view of the contactor.
FIGURE 10 is a partial transverse view of the contactor taken along the line 10–10 in FIGURE 7 and illustrating the method of positioning the carrier on the contactor.
FIGURE 11 is a top view of a modified contactor for use with loose dual in-line packages.
FIGURE 12 is a side view of the contactor illustrated in FIGURE 11.
FIGURE 13 is a partial bottom view of the contactor illustrated in FIGURE 11.
FIGURE 14 is a partial transverse view of the contactor shown in FIGURE 11 taken along the line 14–14.

Referring now in detail to the drawings, wherein like numerals indicate like elements, there is shown an integrated circuit carrier designated generally as 10.

As shown, the carrier 10 consists basically of a box-like structure 12 with a peripheral flange 14. The box 12 and flange 14 are integral and preferably made of a molded plastic which is capable of withstanding temperatures from −65° C. to 150° C. during continuous operation. By way of example, the plastic may be polysulfone, although other types of thermoplastic or even thermosetting materials could be used.

The carrier 10 is shown with an integrated circuit 16 positioned therein. The design of the integrated circuit and its particular function is not relevant to the present invention and therefore will not be described in detail except to point out that it is of the type having dual in-line leads 18 extending laterally outwardly and then at right angles from the sides of the integrated circuit 16. In the embodiment shown, the integrated circuit has fourteen leads, seven on each side. However, such integrated circuits may be manufactured with more or less leads as desired. Integrated circuits with sixteen leads (eight on a side) are known and circuits with as many as twenty-four leads are presently planned.

The interior dimensions of the box 12 are sufficient to receive a body 16 and leads 18 of integrated circuits of the major manufacturers. The dimensions of such integrated circuits for the same number of leads tends to be fairly uniform with variations being in thousandths of an inch. Of course, the dimensions of the entire carrier 10 can be adjusted to accept any particular integrated circuit. By way of example and not limitation, the interior dimensions of the box 12 for a fourteen lead integrated circuit could be .783 inch by .292 inch. The outside dimensions could be .843 inch by .400 inch.

The interior of the side walls 20 and 22 of the box 12 is provided with a plurality of elongated slots 24. As shown, each of the slots extends from the top of the carrier 10 as shown in FIGURE 2 to a point substantially above the bottom. Each of the interiors of side walls 20 and 22 is provided with seven of such slots 24 which are positioned and are of sufficient depth to receive the leads 18 which extend from the integrated circuits 16. By way of example but not limitation, the depth of the slots can be .014 inch while the length of the slot may be .27 inch which compares with an overall height for the walls 20 and 22 of approximately .37 inch. A typical width for the slot is .064 inch.

As best illustrated by referring to FIGURES 1 and 2 of the drawing, the slots are positioned to receive the leads 18 as the integrated circuit is inserted into the carrier 10. Since each lead is positioned in one of the slots, the integrated circuit 16 is effectively being held within the carrier at fourteen positions. The depth of insertion of the integrated circuit 16 into the carrier is controlled by the length of the slots 24. Thus, the leads will bottom on the shoulder 26 as best shown in FIGURE 3. In other words, the slots 24 control the vertical depth of the integrated circuit 16 within the carrier and in effect fix the position of the leads. As is made clear hereinafter, this is important for use in testing or otherwise operating on the integrated circuit while it is within the carrier 10.

The dimensions of the portion of the walls of box 12 which extend outwardly from the flange 14 and in the upward direction as shown in FIGURES 2 and 3, are somewhat smaller than the outside dimensions of the walls which extend downwardly in FIGURES 2 and 3. A recess 28 is formed in the end of the walls adjacent the bottom of the box 12. The recess 28 has dimensions of sufficient size to make the opening to the carrier at that particular position approximately equal to or just slightly larger than the outside dimensions of the top of the wall. As thus constructed, two or more carriers 10 can be stacked by fitting the upward extension of the box 12 into the recess 28.

The flange 14 is designed to provide a means whereby the carrier 10 can be manually manipulated or manipulated by automatic handling equipment. As such, it is provided with three polarization notches 30, 32 and 34 as well as a polarization slot 36. Such polarization notches and slots allow the carrier 10 to be correctly aligned with mechanical handling equipment. The function of such mechanical handling equipment and the manner in which it uses the notches 30, 32, and 34 as well as the slot 36 to align the carrier 10 is well known to those skilled in the art. Accordingly, it need not be described in detail. It is sufficient to say that the polarizing notches and slots make the carrier suitable for fully mechanized loading, feeding, sorting, marking, testing and classification. Holes 38, 40 and 42 with guide chamfers in the top surface of the flange are also provided for cooperation with the handling of equipment.

FIGURE 5 shows a method by which the integrated circuit 16 may be mounted in the carrier. As shown, the integrated circuit 16 is positioned on an upstanding post 44. The carrier 12 is positioned above the integrated circuit 16 either by machine or manually and then moved downwardly to engage the leads 18 in the slots 24. As explained above, the depth of insertion of the integrated circuits is defined by engagement of the leads 18 with the shoulder 26 in each of the slots 24.

FIGURE 6 illustrates the method by which the carrier 10 can be used to position the integrated circuit 16 for removal and insertion into a printed circuit board 46. As shown, the carrier 10 is positioned below the board so that its slots 24 are aligned with holes 48 in the circuit board 46. Thereafter, a mechanism applies a force to the printed circuit 16 which pushes it out of the box 12 against the circuit board 46 with its leads projecting through the holes 48. Thereafter, soldering or other connecting operations can take place. The method of applying force to the integrated circuit 16 can be any of the aforementioned machines or by hand.

Referring now to FIGURES 7–10, there is shown a contactor 50 constructed for cooperating with the carrier 10 to provide a means for connecting the integrated circuit to test stands and the like.

As shown, the contactor 50 includes a base 52 in which are provided two rows of holes 54 for receiving the contacts 56. In the embodiment shown, there are two rows of seven holes for a total of fourteen since the integrated circuit has equal number of contacts. Integral with the base 52 is an upright 58 which is centrally located on the base 52 and spaced inwardly from the periphery thereof as best illustrated in FIGURES 7 and 8. As best shown in FIGURES 7 and 10, the upright 58 is provided with fourteen blind holes 60 in two rows of seven. Holes 60 are preferably square or rectangular in cross section. The blind holes 60 are spaced apart by a distance corresponding to the distance between slots 24 in the carrier 10. In a like manner, the holes 54 are spaced apart by the same distance so that each set of holes 54 and 64 for a particular pair of opposed leads 18 extending from the integrated circuit 16 are in the same plane.

The contacts 56 are formed as spring members which extend vertically through the holes 54, then horizontally with the top of base 52 then upwardly and outwardly toward the side of base 52 and finally inwardly and downwardly to engage in the blind holes 60. In effect, the contacts 56 are shaped somewhat like the Arabic numeral two with an additional leg extending from the base thereof. Contacts 56 may be made of any one of a number of resilient materials that conduct electric current. In the preferred embodiment, the contacts are made of beryllium copper which is spring tempered and plated with gold over nickel.

As thus positioned, the contacts 56 are capable of being biased inwardly toward the center of base 52. As explained below, this construction is used to effect contact with the leads 18 of the integrated circuit in carrier 10.

To retain the contacts 56 in position, an annulus 62 is fixed to the top surface of base 52. The opening in the center of annulus 62 is of sufficient width to be spaced well away from the upright 58 but still overlies the horizontal portion of the contacts 56 to retain the same in position within the contactors 50. Appropriate slots with thickness approximately equal to the thickness of contacts 56 may be provided in the bottom of annulus 62 to receive the same so that the annulus may be brought flush with the top surface of base 52.

As shown in FIGURE 10, the width of holes 60 is substantially greater than the thickness of contacts 56. Thus, the contacts are free to move back and forth within the hole when pressure is applied to them.

The annulus 62 is furher provided with two upstanding posts 64 and 66 which cooperate with polarizing notches in the flange on carrier 10 to assure correct alignment with contactor.

To bring the carrier 10 and the enclosed integrated circuit into position on the contactor 50, it is only necessary to align the polarizing notches 32 and 34 with the polarizing posts 64 and 66 and thereafter insert the upright 58 into the carrier between the leads 18. The contacts 56 will slide over within the holes 60 and engage the leads in the slots 24.

Thereafter, the contactor 16 may be plugged into or otherwise connected to circuit boards and test apparatus or the like.

The contactor 50 is preferably made of a dielectric material capable of continuous operation at temperatures from −65° C. to 150° C. By way of example, polysulfone is one such plastic which may be used.

The cooperation between the slots and the leads permits the spring bias of the contacts 56 to be applied directly to the leads and further assures good contact since the walls of the box 12 act as a backing member.

Referring now to FIGURES 11-14, there is shown a contactor 70 constructed for providing a socket for accepting loose integrated circuits and connecting them to test stands and the like. As best shown in FIGURE 14, dual in-line packages of integrated circuits are provided by the manufacturers with the leads extending laterally from the sides of the package and being bent at an angle with respect to such lateral projection. The lateral extent of the leads is fixed at a predetermined amount which is not to be lessened. In a typical case, the lead rows are 0.300 inch from bend to bend at their lateral extension. From the point of the bend, the leads extend at an obtuse angle with respect to the lateral exension. Thus, the lateral distance between the distal ends of the leads is greater than the lateral distance between the bends. Typically, the leads may taper out until this lateral distance is approximately 0.340 inch.

The purpose in providing an outward taper to the extension of the lead is to assure proper cooperation with the machines that automatically handle the integrated circuits. Thus, when the integrated circuit packages are automatically inserted into printed circuit boards, there normally is a minimum lateral distance beyond which the leads are not to approach each other. For example, this distance could be the 0.300 inch mentioned above. By outwardly tapering the leads to a final distance of 0.340 inch, it is assured that when the distal ends of the leads are brought into 0.300 inch, there is no danger of any lead being deformed to the extent that it could possibly be closer than the set minimum distance between rows. While the lateral distances may vary, the taper of the lead extensions is normally 3°.

The contactor illustrated in FIGURES 11-14 is designed to be used with loose dual in-line packages without disturbing the taper of the lead extension. The integrated circuit packages can be placed in the contactor and tested in the conventional manner. Thereafter, they can be removed from the contactor and set to automatic handling machines with the knowledge that the taper of the leads has not been disturbed.

As shown, contactor 70 includes a base 72 in which are provided two rows of holes 74 for receiving the contacts 76. In the embodiment shown, there are two rows of seven holes for a total of fourteen since the integrated circuit has equal number of parallel holes. Integral with the base 72 is an upright central portion 78. The central portion 78 is spaced inwardly from the periphery of base 72 as best shown in FIGURE 11. The upright 78 is provided with two rows of seven blind holes 80. Holes 80 are preferably rectangular or square in cross section. The holes 80 are spaced apart by a distance corresponding to the longitudinal distance between adjacent leads 81 on the integrated circuit package 83. In a like manner, the longitudinal distance between adjacent holes 74 is the same so that each set of holes 74 and 84 for a particular pair of opposed leads 81 extending from the integrated circuit package 83 are in the same plane.

Contacts 76 are formed as spring members which extend vertically through the holes 74, then horizontally over the top of base 72, then upwardly and outwardly toward the side of base 72, and finally inwardly and downwardly to engage in one of the blind holes 80. In effect, the contacts 76 are shaped somewhat like the Arabic numeral two with an additional leg extending from the end of the base. Contacts 76 may be made of any one of a number of resilient materials that conduct electric current. In the preferred embodiment, the contacts are made of beryllium copper which is spring tempered and plated with gold over nickel. As thus positioned within the contactor 70, the contacts 76 are capable of being biased inwardly toward the center of the base 72. This is possible because the end of the contacts 76 within the blind holes 80 is much smaller than the hole itself, and therefore can be freely moved with the hole.

To retain the contacts in position, an annulus 82 is fixed to the top surface of base 72. The opening in the center of annulus 82 is of sufficient width to be spaced well away from the upright 78 but still overlies the horizontal portion of the contacts 76 to retain the same in position by clamping them against the base 72. Appropriate slots with a thickness approximately equal to the thickness of contacts 76 may be provided in the bottom of annulus 82 to receive the same so that the annulus may be brought flush with the top surface of base 72.

If desired, one of the corners 84 of the upright 78 can be beveled to provide a polarizing means.

To bring the integrated circuit package 83 and its leads 81 into engagement with the contactor 80 it is only necessary to align the leads 81 with the contacts 76 and thereafter push the leads into the opening 86 defined between the contacts 76 and the annulus 82. In the present embodiment, the annulus 82 differs from the annulus 62 of the previous embodiment in that it extends upwardly almost to the height of the upright 78. In addition, the inner side wall of the opening in the annulus 82 is not planar. Beginning at its junction with the base 72, the side wall 88 can be described as slowly curving inwardly toward the upright 78 as it rises from the base 72 and then rapidly curving outwardly from a point approximately ¾ of the way upward from the base 72. In practical terms, the point of outward curvature is intended to be at the same height as the bend which forms the inward curvature of the contact 76 as it starts towards the blind hole 80. By providing the structure as described, the area of contact between the side wall 88 of annulus 82 and the contact 76 will be minimized. Preferably, it is only a line contact across the width of the contact 76.

When the leads 81 are inserted into the contactor 70, they are biased against the wall 88 by the resiliency of contact 76. The taper of the wall 88 is sufficiently large so that it does not engage the leads 81 except where they are biased against it by the contact 76. Or if desired, the incline of wall 88 could be equal to 3° so that the leads slide therealong.

In this manner, the contactor does not disturb the taper of the leads 81 when the integrated circuit package 83 is inserted therein.

We claim:

1. A dual in-line integrated circuit carrier comprising a box structure, said box being opened at two sides thereof, said opening extending from one side to an opposite side, a plurality of slots in the interior side walls of said box for receiving integrated circuit leads, each of said slots extending from said one open side towards said opposite open side, each of said slots terminating intermediate said open side and said opposite open side, a shoulder lying intermediate the termination of each of said slots and said opposite open side for supporting said integrated circuit leads, and a peripheral flange extending laterally from said box, said peripheral flange including means for cooperating with carrier handling equipment.

2. A dual in-line carrier in accordance with claim 1 wherein there are an equal number of slots in each side wall of said box and said slots are oppositely aligned.

3. A dual in-line carrier in accordance with claim 1, said carrier being mounted on a contactor.

4. A carrier for an integrated circuit comprising a box structure, said box being open at two sides thereof and closed at the remaining sides and the ends, said opening extending from one side to an opposite side, a plurality of slots in the interior of two opposed side walls of said box for receiving integrated circuit leads, each of said slots extending from said one open side towards said opposite open side, each of said slots terminating intermediate said open side and said opposite open side, and a peripheral flange extending laterally from said box, said peripheral flange including means for cooperating with carrier handling equipment, said means including at least a polarization slot on one surface of the flange.

5. A carrier in accordance with claim 4 wherein said peripheral flange extends from opposite sides of said box, and said polarization slot is on one surface of only one flange.

References Cited

UNITED STATES PATENTS

| | | | |
|---|---|---|---|
| 3,407,379 | 10/1968 | Nakazawa et al. | |
| 3,225,324 | 12/1965 | Comfort | 339—192 |
| 3,311,790 | 3/1967 | Vizzier et al. | 339—174 |
| 3,345,541 | 10/1967 | Cobaugh et al. | 339—17 X |
| 3,325,772 | 6/1967 | Suverkropp | 339—193 |

FOREIGN PATENTS

| | | |
|---|---|---|
| 744,012 | 1/1956 | Great Britain. |
| 903,852 | 8/1962 | Great Britain. |
| 1,021,986 | 3/1966 | Great Britain. |

REINALDO P. MACHADO, Primary Examiner

PHILIP C. KANNAN, Assistant Examiner

U.S. Cl. X.R.

339—176